March 6, 1956 F. BERRY 2,737,020
ROTARY PUMP AND MOTOR HYDRAULIC TRANSMISSION
Filed Oct. 25, 1949 5 Sheets-Sheet 1
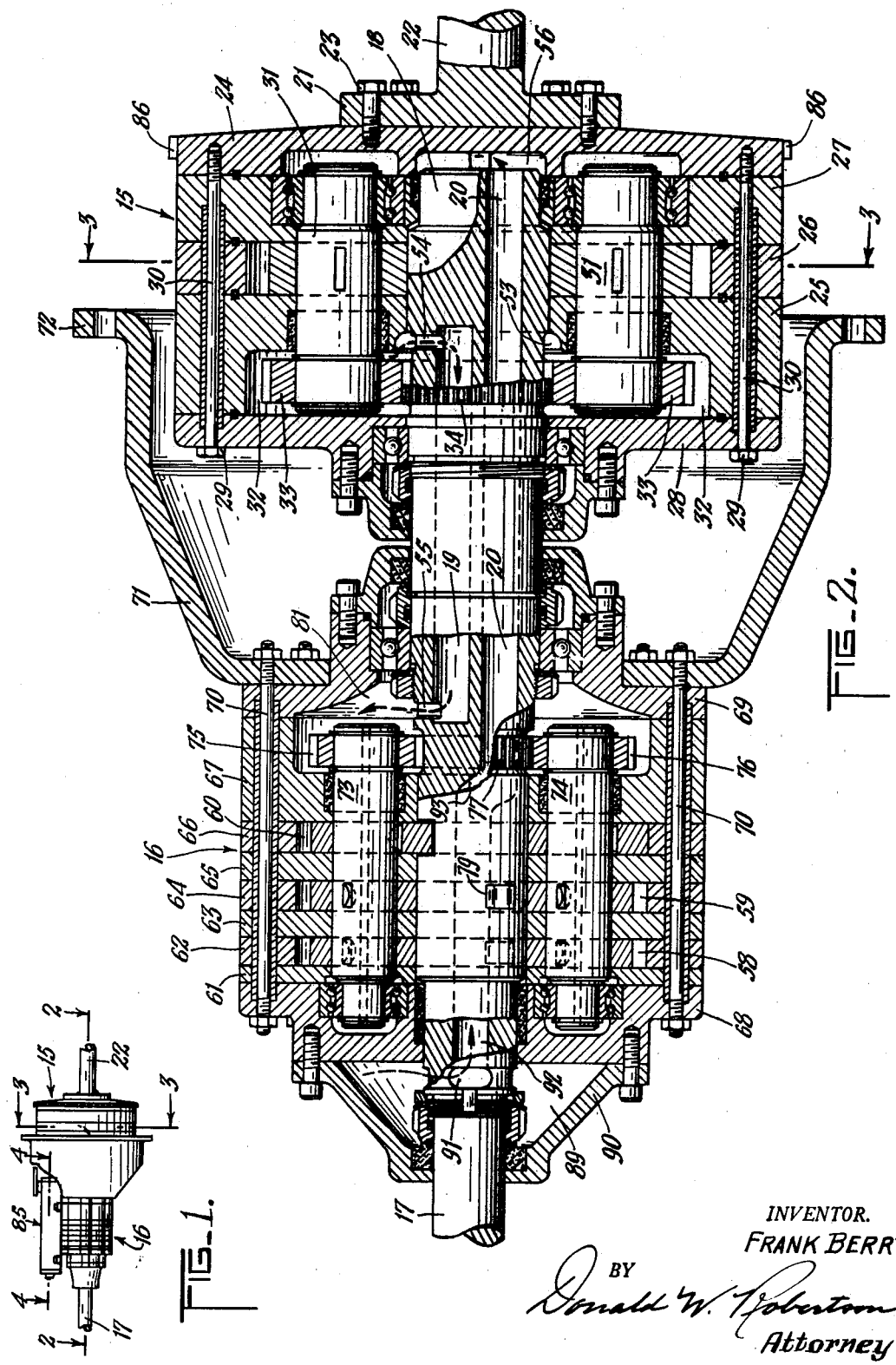
INVENTOR.
FRANK BERRY
BY
Donald W. Robertson
Attorney

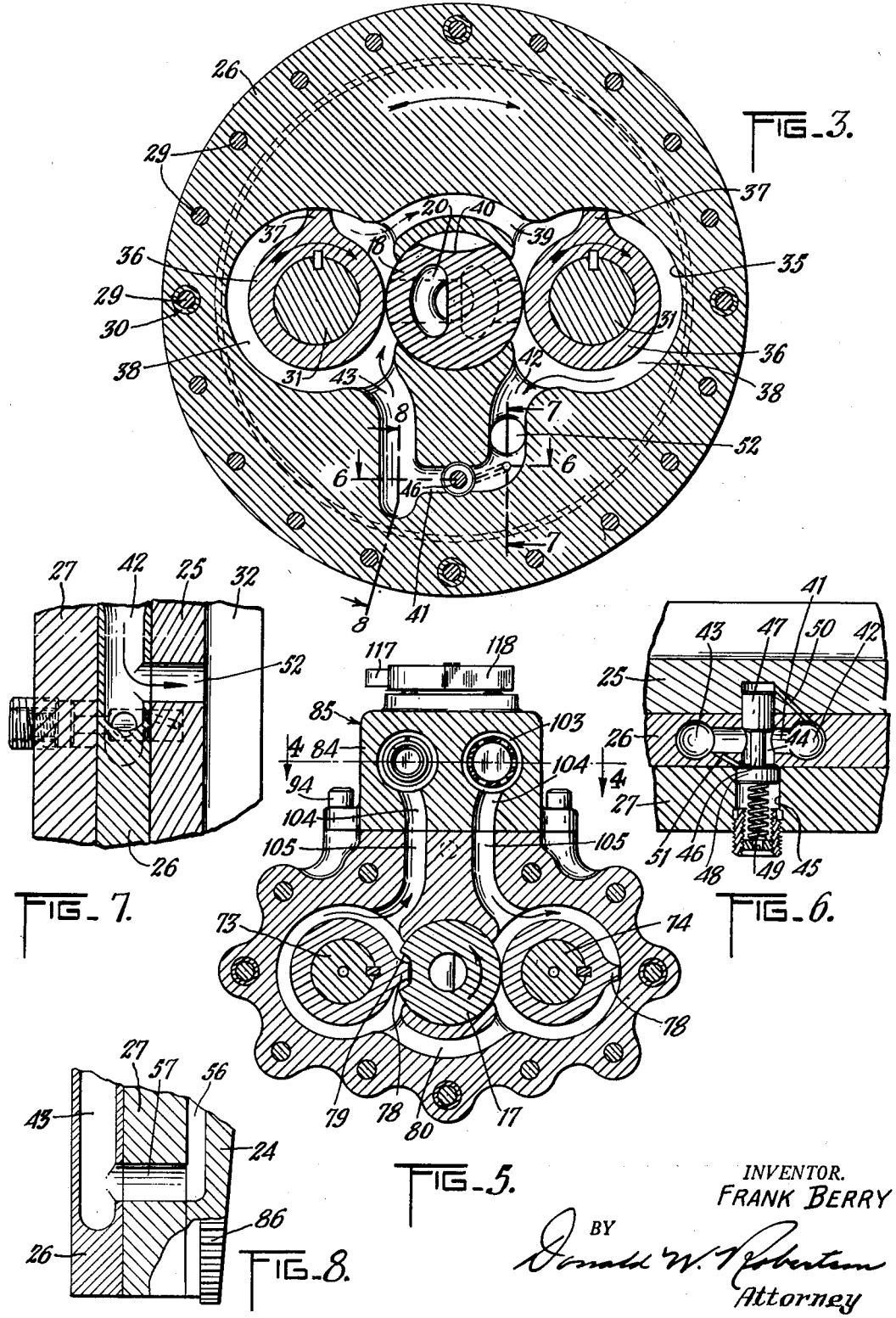

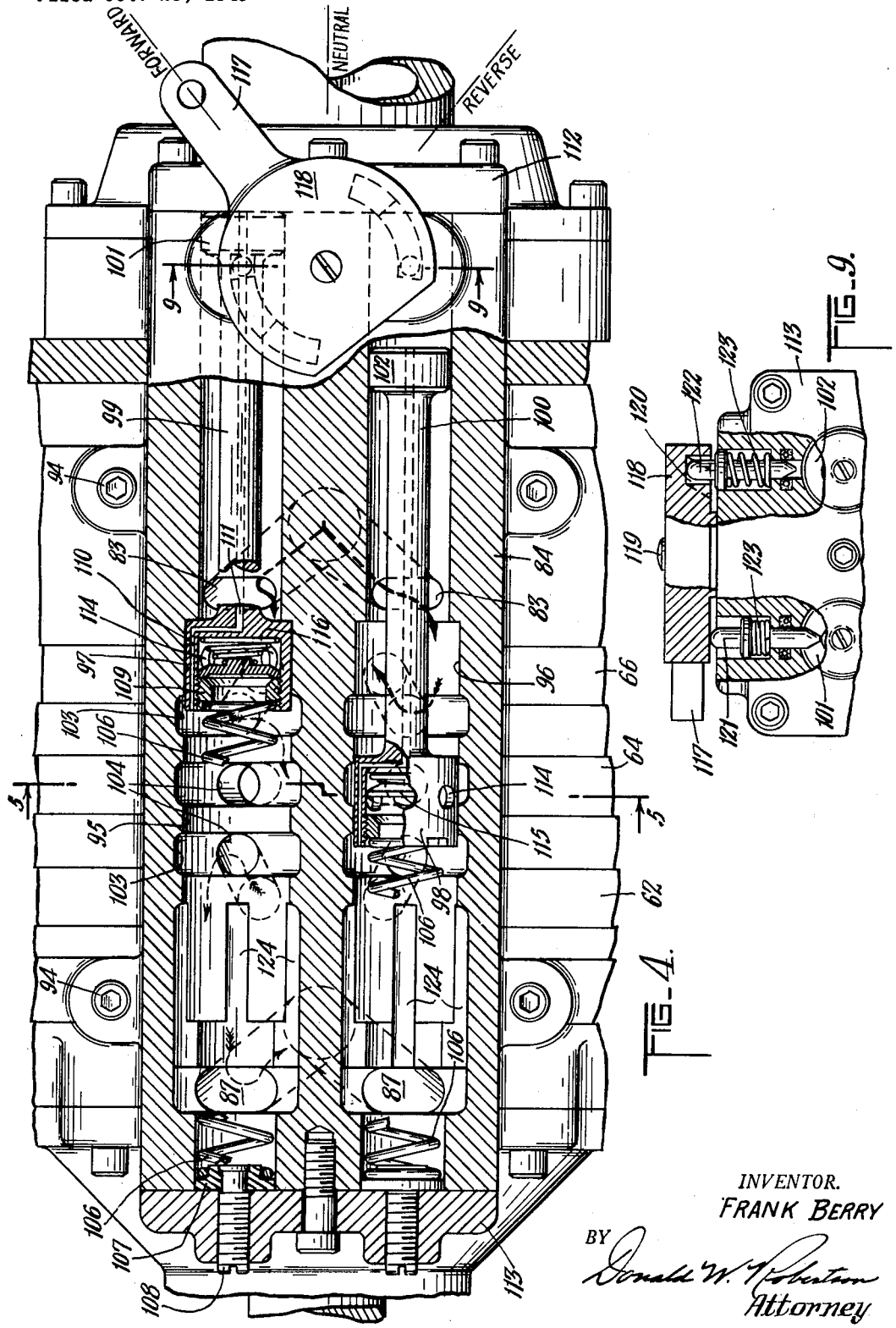

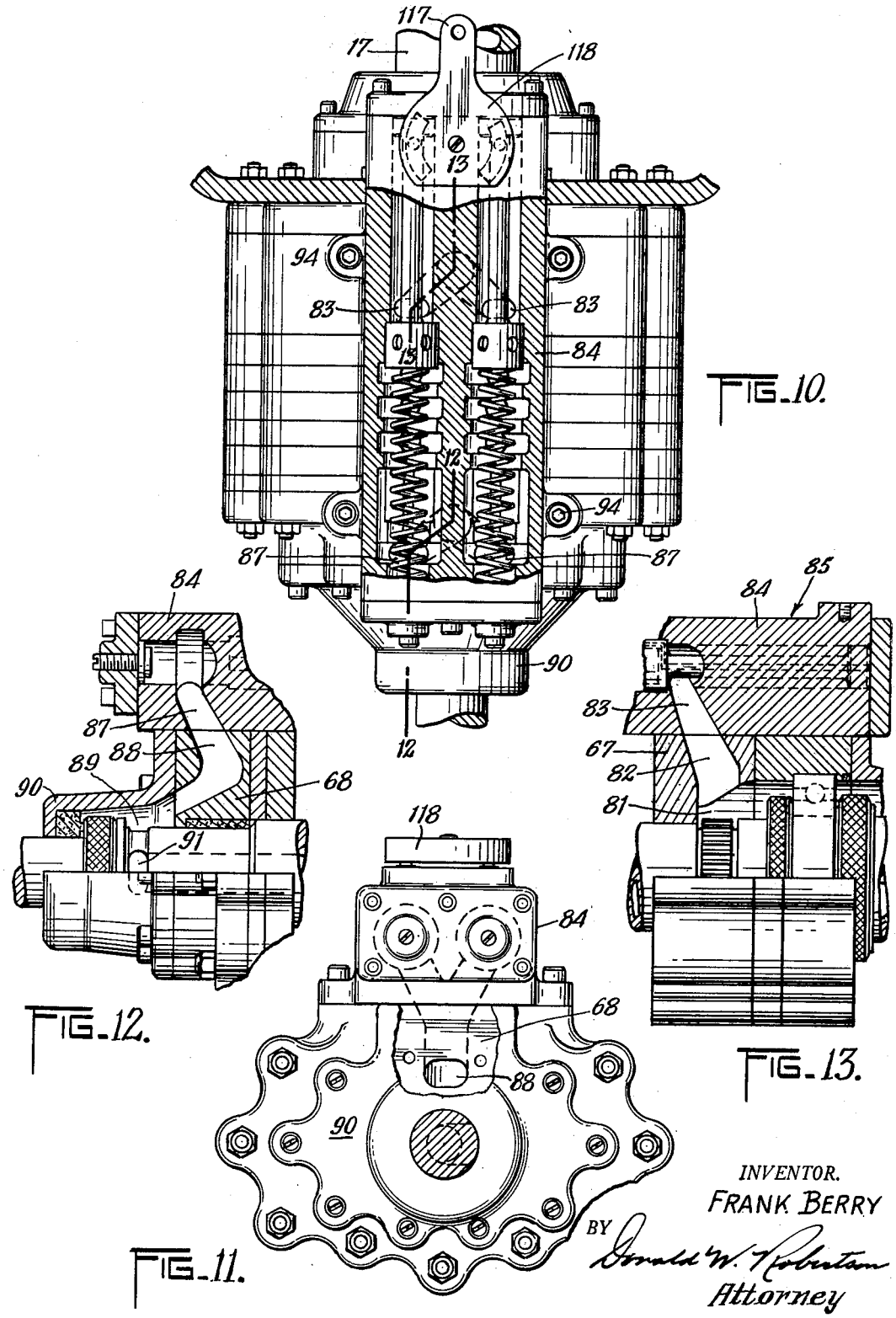

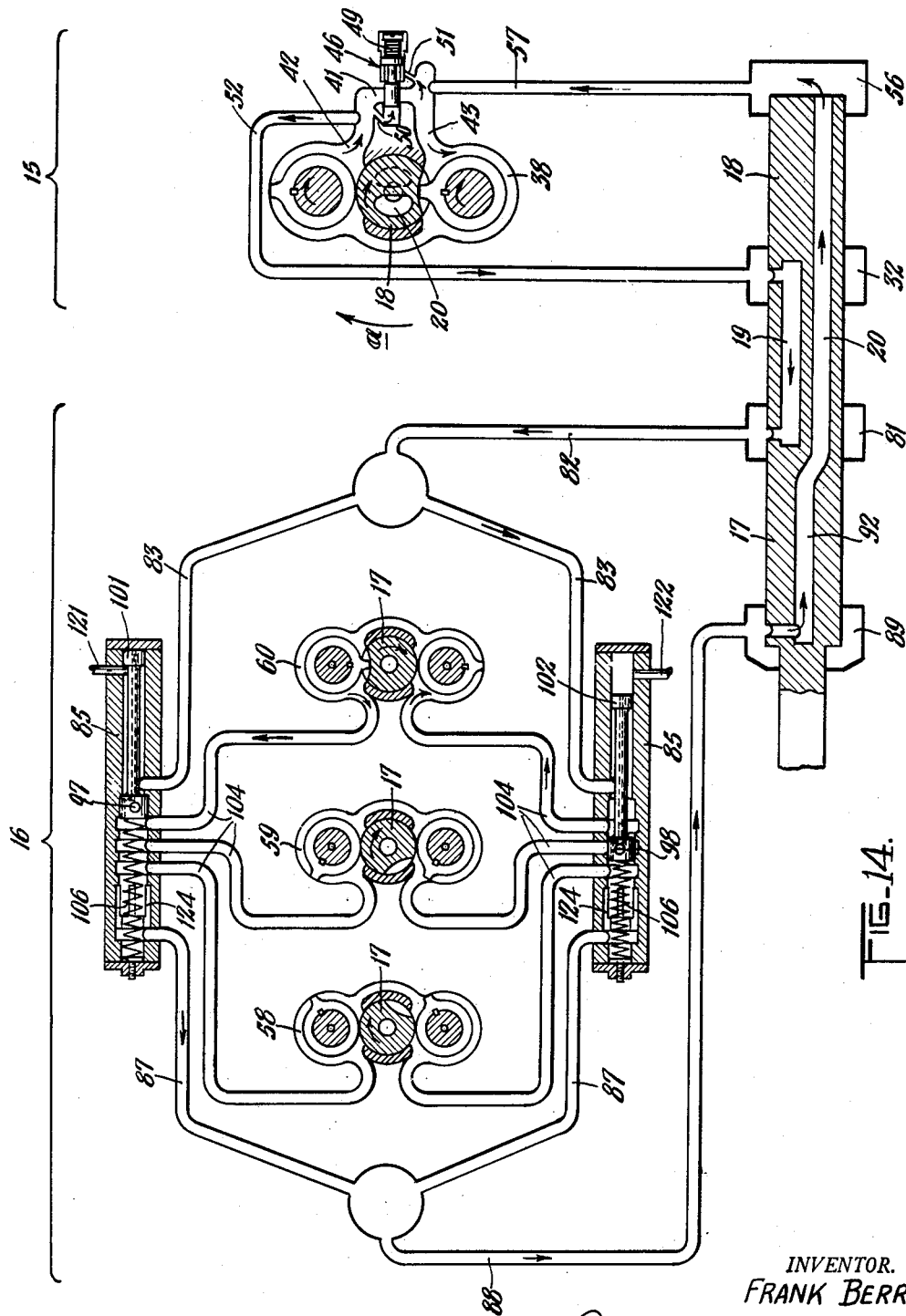

United States Patent Office 2,737,020
Patented Mar. 6, 1956

2,737,020

ROTARY PUMP AND MOTOR HYDRAULIC TRANSMISSION

Frank Berry, Corinth, Miss., assignor, by mesne assignments, to Oliver Iron and Steel Corporation, Pittsburgh, Pa., a corporation of Pennsylvania Application October 25, 1949, Serial No. 123,504

4 Claims. (Cl. 60—53)

The invention relates to automatically variable hydraulic power transmissions and is applicable to transmissions for motor cars and trucks, tractors, railroad locomotives, aircraft, marinecraft, drives for stationary machines, or in other words to virtually any type of installation where a variable power transmission may be employed.

Summary

My invention comprises in its general arrangement a rotary hydraulic pump and a rotary hydraulic motor, hydraulically coupled through connected fluid inlets and outlets and mechanically coupled through connected rotary elements as by a rotatable shaft which constitutes both the fluid-driven shaft of the motor and a rotary element of the pump. In my preferred construction the connected rotary elements of the motor and pump are constituted by a shaft common to the motor and pump, which units are of what is commonly known as the rotary abutment type. This shaft preferably is arranged to serve as the rotary abutment valve of both the motor and pump units.

An important feature of my invention as embodied in the preferred construction to be described is the provision for relative bodily rotation between the pump and motor, as by arranging the pump for bodily rotation around the abutment shaft. With this arrangement the rate of fluid discharge from the pump is automatically varied in accordance with changes in the relative speeds of the driven shaft of the motor and the bodily rotating pump, or in accordance with the differential between the relative speeds of bodily rotation of the pump and motor and the speed of rotation of the common shaft or connected rotary elements of the two units.

The motor itself also embodies a variable torque arrangement such as provided by rotary fluid-driven members connected in parallel to the fluid outlet and inlet of the pump, with a valve operable in response to changes in pressure in the fluid discharged from the pump to open the connection to one or more of such rotary fluid-driven members and thereby vary the torque ratio between the pump and motor. Further, in my preferred construction this valve is arranged to close the connection to all of such rotary fluid-driven members under low torque ratio conditions to thereby close the outlet of the pump, so that the transmission is hydraulically locked in "high gear" to give a direct drive through the common shaft of the motor and pump, or through the aforesaid connected rotary elements.

Another important feature is the provision of a combination hydraulic pump and by-pass valve unit, the valve unit comprising a valve operable hydraulically in response to changes in fluid pressure within the pump for by-passing fluid directly from the pump outlet to the pump inlet under low pressure idling conditions, and for closing the by-pass to transfer fluid to the motor under high pressure driving conditions. In my preferred construction this by-pass valve comprises two connected pistons of different sizes to create a pressure differential, the by-pass being arranged to be closed by the smaller of the two pistons. A fluid connection on the high pressure side of the valve is arranged to hold the valve in closed position under high pressure or driving conditions. Another fluid connection from the low pressure side of the valve to a central portion of the differential piston maintains the pressure differential for holding the valve in closed position under conditions where pressure is reversed in the pump, as in deceleration of the pump or of the hydraulic motor operated thereby, or of both the pump and the motor.

Automatic hydraulic transmissions as developed heretofore primarily for driving motor cars, tanks, etc. have proved very successful and are today gaining wider and wider acceptance notwithstanding certain recognized disadvantages as compared with conventional non-automatic transmissions employing a manual gear shift and clutch. One such disadvantage is a certain loss in efficiency peculiar to those commercial automatic transmissions in which the driving fluid is constantly in motion at high velocities, and in which an appreciable amount of slippage occurs between the mechanical parts of the drive due to the fact that there is no positive hydraulic or mechanical block between them. This problem has been considered to be of sufficiently serious consequence that at least one large motor manufacturer has developed an automatic transmission which includes a separate mechanical clutch to make it possible to obtain a frictional lock in top speed or overdrive.

Another disadvantage of automatic hydraulic transmissions now used in automotive drives is that their construction is complicated and expensive, so expensive in fact that motor car manufacturers have been compelled to reject the automatic transmission for standard model cars and to include it only as an optional "extra" at a substantially increased price to the buyer.

It is the primary object of my invention to overcome these and other disadvantages of automatic hydraulic transmissions heretofore known or used, i. e. to make it possible to achieve higher efficiencies and lower construction costs.

Description

As has been noted at the outset, the invention is applicable to automatic transmissions for use wherever an automatic variable torque drive is required. Perhaps the largest field of use is in drives for automotive vehicles, so throughout the following description I shall refer more particularly to automotive drives as used for example in automobiles. However it will be understood that the features of the preferred embodiment illustrated in the drawings are applicable to transmissions for other purposes. The embodiment selected for illustration is representative of the construction which I presently consider best.

Fig. 1 is a side elevational view of the transmission. This view is drawn to a reduced scale and is intended primarily as an index to the various cross-sectional views.

Fig. 2 is a central horizontal longitudinal sectional view of the complete transmission taken as indicated at 2—2 in Fig. 1.

Fig. 3 is a vertical transverse sectional view taken through the annular cylinders of the pump as indicated at 3—3 in Figs. 1 and 2.

Fig. 4 is an enlarged detail horizontal sectional view taken as indicated at 4—4 in Figs. 1 and 5 and showing the construction of the automatic valves controlling the torque ratio within the motor unit, and the manual selector for forward, neutral and reverse operation. This view shows the selector in forward position with the valves in the positions which they occupy in what may be described as the third speed forward.

Fig. 5 is a vertical transverse sectional view taken through the annular cylinders of one of the sections of the motor. This view is on line 5—5 of Fig. 4 to reduced scale.

Figs. 6, 7 and 8 are detail cross-sectional views of the pump by-pass means taken as indicated at 6—6, 7—7 and 8—8 respectively in Fig. 3.

Fig. 9 is a fragmentary end view of the valve housing with parts shown in section on line 9—9 of Fig. 4.

Fig. 10 is a view similar to Fig. 4 but drawn to a smaller scale and showing the valves in neutral position.

Fig. 11 is an end view of the motor with the end cover plate partly broken away to reveal the porting.

Figs. 12 and 13 are detail cross-sectional views taken as indicated at 12—12 and 13—13 respectively in Fig. 10.

Fig. 14 is a diagrammatic representation of the complete transmission.

Referring particularly to Fig. 2, the transmission selected to illustrate my preferred construction comprises a rotary hydraulic pump indicated generally at 15 and a rotary hydraulic motor indicated generally at 16 with interconnected fluid inlets and outlets arranged to drive the motor hydraulically from the pump. The driven shaft 17 of the motor extends beyond the end of the motor housing (to the right as viewed in Fig. 2) for connection integrally or otherwise to a rotary element 18 of the pump. In the construction shown this rotary element 18 is an integral part of shaft 17, which I consider to be the most advantageous arrangement. However it will be understood that motor shaft 17 and rotary pump element 18 could be formed as separate elements so long as they are coupled together for rotation at the same speed or at a fixed speed ratio, so that the action of the pump is modified in accordance with the speed of shaft 17 in the manner which will be described.

The connected fluid inlets and outlets of the pump and motor comprise fluid passages 19 and 20, the high pressure fluid discharged from the pump entering the motor via passage 19, and the low pressure fluid returning from the motor via passage 20. Pump 15 is suitably connected to a prime mover as by means of a coupling flange 21 fixed to drive shaft 22 of an internal combustion engine. Coupling flange 21 may be secured by screws 23 to the cover plate 24 of the pump housing. The pump is bodily rotated by shaft 22 relative to motor 16 about the axis of shaft 17, 18 and preferably constitutes the flywheel of the transmission. If desired, gear teeth 86 may be provided around the periphery of cover plate 24 for engagement by the gear of a suitable electric starter for cranking the prime mover.

Referring to Figs. 2 and 3, the rotary abutment type pump shown is built up of a series of plate-like housing members 25, 26 and 27, and end cover plates 24 and 28. These members are secured together by a series of bolts 29 passing through alignment sleeves 30 or extending through aligned apertures in the various housing members and screwing into cover plate 24. Housing members 25, 26 and 27 have aligned openings to receive the end 18 of shaft 17 and to receive the piston rotor shafts 31, 31 whose axes are spaced from and parallel to rotary abutment 18. Suitable bearings for the rotor shafts 31 are provided in housing members 25 and 27, as clearly shown in Fig. 2. Housing member 25 is recessed at 32 to form a chamber for pinions 33 fixed to piston rotor shafts 31 for engagement with gear teeth 34 on the abutment rotor 18. In the embodiment shown, the driving ratio between pinions 33 and gear 34 is 1:1. As shown best in Fig. 3, housing member 26 is formed with cylindrical recesses 35 intersecting the opening for rotary abutment 18. Piston rotors 36 fixed to shafts 31 have pistons 37 slidably engaging the surfaces of recesses 35 and rotatable in the annular cylinders 38 formed between housing members 25, 26, and 27, and piston rotors 36. Annular cylinders 38 are connected by a fluid passage 39 extending through housing member 26 and around abutment rotor 18. The abutment rotor has a recess 40 to clear the pistons 37 as they pass the abutment.

The automatic pump by-pass means incorporated in the pump unit 15 will now be described with reference to Figs. 3 and 5 to 8 inclusive. It comprises a by-pass channel 41 connecting the high pressure outlet 42 of the pump with the low pressure fluid inlet 43. A valve channelway 44 (Fig. 6) arranged transversely of by-pass 41 extends through housing member 26 and into member 25. Coaxially arranged with valve channelway 44 is a channel 45 slightly larger in cross-sectional area than channelway 44. A differential piston valve 46 is slidably arranged in these channelways. This valve comprises two connected pistons of different sizes, a smaller piston 47 and a larger one 48. By-pass 41 is arranged to be closed by the smaller of the two pistons, but under low pressure idling conditions is held in the open position shown in Fig. 6 by means of a compression spring 49, the degree of compression being adjustable by means of the screw-threaded mounting at its end. A fluid connection, such as provided by the small bore 50, extends from the high pressure fluid outlet 42 to the end of valve channelway 47, i. e. to the chamber at the end of the smaller piston 47. Another fluid connection, such as provided by the small bore 51, extends from the low pressure inlet 43 to the central reduced portion of the differential piston 46. The purpose of spring 49 is to hold the valve in open position under low pressure idling conditions, the purpose of connection 50 is to hold the valve in closed position against the action of said spring under high pressure or driving conditions, and the purpose of connection 51 is to maintain a pressure differential for holding the valve in closed position under conditions where pressure is reversed in the pump, as in deceleration of the pump or of the motor operated thereby, or of both the pump and the motor. The purposes and operation of this hydraulic valve will be considered further in describing the operation of the transmission as a whole.

The high pressure pump outlet 42 adjoins a longitudinally extending opening 52 (Fig. 7) extending through housing member 25 to conduct high pressure fluid from the pump discharge to gear chamber 32. From this chamber the fluid passes into an annular groove 53 in member 25, thence through a transverse bore 54 (as indicated by the heavy dotted arrow in Fig. 2) into the longitudinal fluid passage 19 of shaft 17. From this passage it flows through transverse bore 55 into the motor 16. Low pressure fluid returning from the motor via passage 20 in the shaft is discharged at the end of the shaft into chamber 56 formed by a recess in cover plate 24 of the pump housing. From this chamber the fluid passes through a longitudinal opening 57 through housing member 27 and intersecting low pressure inlet 43 of the pump.

The hydraulic motor 16 (Figs. 2 and 5) is of a construction similar to that of the pump 15 but has several pairs of annular cylinders 58, 59 and 60 coaxially arranged. While I have chosen for illustrative purposes a motor unit comprising three pairs of coaxially arranged annular cylinders, it will be understood that the motor may have a lesser or greater number of cylinders as may be desired, depending upon the type of operation required in a particular installation. Three pairs of cylinders give four primary speeds or torque ratios, modified during the transition from one speed ratio to another by the differential planetary action of the interconnected motor and pump units, as will appear.

The rotary hydraulic motor, when of the abutment type illustrated, preferably is built up of annular plate-like housing members 61, 62, 63, 64, 65, 66 and 67 with end plates 68 and 69 bolted together by means of a series of tie-rods 70 extending through aligned apertures in the housing members and also through the end of a flywheel housing 71. The complete transmission may be mounted for example in the main chassis frame of an automobile by means of a flange 72 on the flywheel housing, with the usual couplings to the motor and drive shaft. Piston rotor shafts 73, 74 are mounted in suitable bearings in the motor housing. Fixed to these shafts are pinions 75, 76 meshing with a gear or gear teeth 77 on shaft 17. Also fixed to piston rotor shafts 73 and 74 are a series of piston rotors with pistons 78 slidably arranged for rotation with the shafts 73 and 74 in the respective pairs of annular cylinders 58, 59 and 60. In line with each pair of annular cylinders the shaft 17 is provided with a recess 79 to clear the pistons as they pass the shaft, thus providing a rotary abutment valve for each pair of cylinders, these recesses being spaced 120° apart around the shaft 17 in the particular embodiment shown. Each pair of annular cylinders 58, 59 and 60 are connected by a fluid passage 80 extending through the respective housing members and around abutment rotor 17 (see Fig. 5).

High pressure fluid discharged from shaft 17 through port 55 enters a chamber 81 formed by complementary recesses in end plate 69 and housing member 67, as indicated by the heavy dotted arrow in Fig. 2. From chamber 81 the fluid enters a passage 82 at the top of housing member 67 and connecting passages 83, 83 in the lower side of body 84 of the automatic variable control valve indicated generally at 85 (see Figs. 13 and 14). Fluid entering valve 85, under certain conditions of operation to be described, next enters one or more of the cylinders of the motor and is returned to valve 85. This low pressure fluid then is discharged through one of the pair of passages 87 in body 84 of the valve and enters a connecting passage 88 in end plate 68 of the motor housing, from which it is discharged into chamber 89 of seal cover plate 90 bolted to end plate 68 (see Figs. 12 and 14). From chamber 89 the low pressure fluid passes through a transverse port 91 which is in communication with a central bore 92 (in the manner indicated by the light dotted arrow) in shaft 17 connected to passage 20 at 93 for return to the low pressure side of the pump in the manner which already has been described.

The bearings and shaft seals at the adjacent ends of pump 15 and motor 16 are of more or less conventional construction, adequately illustrated in Fig. 2 and not requiring detailed description. Shaft 17 rotates in the fixed motor bearings and also in the moving pump bearings, and pump 15, as we have seen, is bodily rotatable about the shaft.

Referring more particularly to Figs. 4, 9 and 10, I shall now describe the preferred construction of the automatic control valve mechanism and its manual selector. Body casting 84 of this valve is secured to the top of the motor housing as by means of screws 94. A pair of longitudinally extending valve channelways 95, 96 are formed in body 84 slidably to receive pistons 97, 98 fixed to valve stems 99, 100 having enlarged ends 101, 102, slidably received in the reduced portions of valve channelways 95, 96 (right-hand end of Fig. 4). Entering passages 83, 83 for the high pressure fluid from the pump are in communication with the reduced portions of valve channelways 95, 96. At the left-hand end as viewed in Fig. 4, the valve channelways are enlarged and are in communication with the discharge passageways 87 for the low pressure fluid returned from the motor. The central portions of valve channelways 95, 96 are relieved by a series of annular chambers 103, one for each pair of motor cylinders for each valve channelway. One of a series of inlet-outlet ports 104 connects each chamber 103 with the inlet-outlet passages 105 of the motor. (These passages are either inlets or outlets depending upon whether the motor is being driven in the forward direction or in reverse.) Valve pistons 97 and 98 are urged to the right as viewed in Fig. 4 by means of compression springs 106, bearing at one end against a seat 107, the position of which is adjustable by means of a screw 108 in the cover plate 113 at the end of the valve body to give the desired initial compression, and bearing at its other end against a seat 109 screwed into the hollow end of the valve piston. A small passage 110 extends through the skirt and head of the piston, where it joins a central bore 111 in valve stem 99 (or 100). This provides a relief for movement of the valve, permitting fluid to flow through the piston and valve stem as it reciprocates, preventing hunting action and avoiding creation of either a pressure lock or a vacuum between the enlarged end 101 (or 102) of the valve stem and the end of the reduced portion of the valve channelway where it is closed by cover plate 112. The skirt of the piston 97 (or 98) of the valve is provided with a series of peripheral openings 114. An auxiliary check valve 115 is slidably received within the skirt of the piston to pass from one side to the other of openings 114. Normally this check valve is held in the position shown in piston 97 (as viewed in Fig. 4) by means of compression spring 116. The purpose of this arrangement is to permit automatic operation of the valves without locking the fluid flow as the piston moves to cover or uncover the successive ports 104, and without loss of pressure. Whenever the piston moves into a position which would completely block one of the ports, fluid from the low pressure side of the piston enters the interior of the piston, forcing check valve 115 to the right as viewed in Fig. 4 and permitting free passage of the low pressure fluid through the peripheral openings 97 in the skirt of the piston. Another important function of this piston valve construction is that it maintains pressure on the high pressure side of the piston regardless of its position. This is accomplished by the proper longitudinal spacing of peripheral openings 114 in relation to check valve 115 such that when the check valve is closed by spring 116, the valve 115 is to the left of the openings 114, thus blocking flow of fluid through the piston from the high pressure side of the piston when the piston is in a position which would permit high pressure fluid to flow into one of the annular chambers 103 and through openings 114.

The manual selector for forward, neutral and reverse operation comprises an arm 117 connected to a cam member 118 pivotally mounted as by means of a screw 119 to the top of valve body 84 near the ends of the reduced portions of the valve channelways. Inclined cam surfaces 120 in the under side of member 118 are arranged to engage locking pins 121, 122 extending through the top of the valve body at points where the respective pins can be brought into engagement with the inside of the enlarged portions 101, 102 of the valve stems 99, 100. In Figs. 4 and 9, the manual selector is in forward position in which it holds pin 121 downwardly against the action of a compression spring 123. This locks reverse control valve 97 in the position shown in Fig. 9. In this same position of the manual selector, pin 122 is held in the raised position by its spring 123 in which it is out of engagement with the enlarged end 102 of the forward control valve 98, permitting this valve to operate in response to changes in the fluid pressure discharge from the pump. When the manual selector is moved into the neutral position indicated by the legend on Fig. 4, i. e., by bringing the axis of selector arm 117 into the position shown by the dash line marked "Neutral," pin 121 is partially raised and pin 122 partially lowered through the action of cam surfaces 120, freeing both valves. When the manual selector is moved into the reverse position indicated by the legend in Fig. 4, pin 122 is completely depressed to lock forward control valve 98 in its fully closed position while pin 121 is fully raised to free the automatic action of the reverse control valve 97.

*Operation*

Referring to Fig. 14, I will now describe the mode of operation of the complete hydraulic transmission as applied for example to highway vehicles. In Fig. 14 the arrangement of the pump and motor units 15, 16 and their common shaft 17, 18 is schematic; for example, the several pairs of cylinders 58, 59, 60 of motor unit 16 have been separated or "exploded" in order to more clearly show the hydraulic circuit. Also, for the same purpose shaft 17, 18 has been shown separately, and the view of course is not drawn to scale.

The part of the view at the right-hand which is bracketed at 15 at the top of the sheet, represents the pump unit 15, and the part which is bracketed at 16 represents the motor unit 16. The automatic variable hydraulic control valve 85 has been separated into two parts at the top and bottom of the view. In operation only one of the control valves 97, 98 is freed for automatic operation at a particular time (except in "neutral" when both are free), depending upon whether the car is to be driven in forward or in reverse, but in either case the oil flows through both of the sections of the valve, as will appear.

Let us assume that the car is parked on a level stretch of roadway and that the operator wishes to start the car in the forward direction. He will first see that the control arm 117 (Fig. 4) is placed in neutral position. He will operate this control from a suitable lever or plunger arranged on the steering post or dashboard of the car, and if desired this control can be electrically interlocked with the electric starter mechanism for the internal combustion engine, making it impossible to start the engine unless the control is in neutral position. He then steps on the starter which engages teeth 86 (Fig. 2) of the pump flywheel unit, spinning shaft 22 to start the engine. With the engine running at idling speed, the operator now moves the control or "selector" to bring arm 117 into the forward position shown in Fig. 4. This brings locking pin 121 into the position indicated in all of the drawings and which can be seen in the diagram, Fig. 14, with pin 122 retracted. Thus control piston 97 is locked to the right, while piston 98 is free to move. At idling speed the automatic pump by-pass valve 46 will be in the open position shown in Fig. 6 where it is held by the action of compression spring 49. With this valve open, fluid discharged from the high pressure outlet 42 of the pump is free to flow through by-pass 41 into the low pressure inlet 43 of the pump and does not create driving pressure on the motor. Consequently as the pump unit is bodily rotated about the axis of the stationary drive shaft 17, 18 in the direction indicated by the arrow *a*, the resulting pumping action merely drives the fluid through the pump circuit via the by-pass 41 without exerting a driving action on the motor 16. Hence control piston 98 of the motor unit remains in its extreme right-hand position under the action of its compression spring 106.

The operator now steps on the accelerator, increasing the R. P. M. of the pump. This builds up the pressure at the high pressure outlet 42 of the pump to the point where the increased pressure transmitted via bore 50 to the end of differential piston valve 46 is sufficient to move the valve to the right as viewed in Fig. 14, and into the position there shown against the action of spring 49 to close by-pass 41. When this occurs, high pressure fluid discharged from pump outlet 42 is forced into passage 52 leading to gear chamber 32 surrounding shaft 17, 18 from which it enters shaft passage 19 to be discharged into gear chamber 81 of the motor. From this chamber the fluid passes through port 82 which is in communication with connecting passages 83 of control valve 85. However, since control piston 97 is locked in the position shown in the diagram, the driving fluid must seek an outlet through that one of the connecting passages 83 which leads into the cylinder of control piston 98. The effective cross-sectional area of piston 98 is greater than the effective cross-sectional area of the enlarged head 102 of the valve, and the pressure differential thus created moves piston 98 to the left as viewed in Fig. 14 against the action of compression spring 106. How far it will move depends in part upon the force required to start the car in motion and in part upon the rate of acceleration of the prime mover. Under conditions of high acceleration, piston 98 will be moved to the left far enough to uncover all of the connecting ports 104. Thus the force of the high pressure fluid from the pump will be distributed between the cylinders 58, 59 and 60 of all three sections of the motor, producing the maximum starting torque ratio. The fluid entering the motor through ports 104 drives the pistons, producing rotation of geared abutment and drive shaft 17 in the direction shown by the arrows. In the event the operator should accelerate too rapidly, or under any conditions of operation which would tend to stall the prime mover or overload the transmission or drive shaft of the car, sufficient pressure is built up in the hydraulic circuit to move piston 98 into a position which uncovers relief passages 124 leading to passage 87. This permits some of the driving fluid to by-pass the motor for direct return to the pump, until the pressure is reduced within safe operating limits when the piston 98 returns to one of its normal operating positions, closing the by-pass.

As soon as the drive shaft begins to turn, starting the car forward, rotary element 18 of the pump also turns with the shaft in the direction shown by the arrow. It will be observed that the direction of rotation of element 18 is the same as the direction of bodily rotation of the pump (arrow *a*). Consequently for a given speed of drive shaft 22, rate of fluid discharge from the pump remains constant only so long as drive shaft 17, 18 is at rest or is rotating at a constant speed, because as shaft 18 begins to rotate or as its speed is increased, the differential between the speed of bodily rotation of the pump and rotary element 18 thereof is decreased. This is a planetary system in which rotary element 18 of the pump is the "sun" gear and the piston rotors are the planets. The torque ratio between shaft 22 and shaft 17, 18 is infinitely variable in accordance with the rate of acceleration of the car in either a forward or reverse direction.

Now, as the differential between the rate of rotation of the pump about its axis and the rate of rotation of the rotary element 18 of the pump about the same axis decreases, the rate of discharge of high pressure fluid from the pump decreases, decreasing the pressure in the system. When the pressure has been decreased by a predetermined amount through this action, or through decreasing the speed of drive shaft 22, control piston 98 will be moved to the right as viewed in Fig. 14 to close one or more of the ports 104 and thus to cut out one or more sections of the motor unit. In its extreme left-hand position we have seen that all three sections of the motor are being driven. As the piston 98 begins to move to the right, cylinders 58 are first cut out of operation. Further movement will also close the port to cylinders 59, leaving only cylinders 60 in operation. This is the condition illustrated in Fig. 14. When one of the sections of the motor has been cut out of the high pressure circuit in this manner, that section begins to act as an idling pump due to the continued rotation of shaft 17, and the fluid from the discharge of the pump simply passes around through valve 85 and passages 87 and back into the cylinders without appreciable resistance to the flow.

With motor sections 58, 59 and 60 all operating in the high pressure circuit—i. e. with valve 98 to the extreme left—the transmission is in what might be described as "low gear." With sections 59 and 60 only acting in the high pressure system, we could then refer to being in "second gear." Similarly with section 60 alone operating in the high pressure system, we have "third gear," and after all of the sections of the motor have been cut out of operation we are in "fourth gear."

While I have shown and described a transmission embodying a motor with three driving sections arranged in parallel, it will be understood that a greater or fewer number can be employed as may be desired, depending upon the conditions of operation for which the transmission is designed. In some cases it may be desirable to have as many as seven or eight sections.

I will now describe in greater detail the operation of what we have called "fourth gear," that is, with all of the ports 104 closed so that all of the cylinder sections are operating as circulating pumps under substantially no-load condition. This is the condition which will prevail when the car is being driven at a constant normal or elevated driving speed along a level stretch of road, the pressure in the system being sufficiently low for piston 98 to be held in its extreme right-hand position by the spring 106. When the piston is in this position there can of course be no fluid flow from the pump through the motor unit. The pump is therefore compelled to rotate bodily on its axis at the same or substantially the same speed as shaft 17, 18, under which condition no pumping action will occur, and in effect we have a direct drive from the engine shaft 22 through the locked hydraulic system to driven shaft 17 of the motor, producing maximum efficiency. It may be observed at this point that throughout the operation of my transmission the hydraulic driving action is extremely positive. That is, there cannot be any substantial amount of slippage because the driving fluid is always locked between the mechanical elements. Moreover the final locking action which occurs in the top driving speed, i. e. at the lowest torque ratio, takes place entirely automatically and without the use of any sort of auxiliary mechanical clutch.

If it is desired to pick up speed rapidly as, for example, in passing another car, the driver will of course depress the accelerator sharply. This will increase the pressure in the system sufficiently to move piston 98 to the left and bring one or more of the sections of the motor into operation to increase the torque ratio and permit rapid pickup in the driving speed.

Now let us assume that the car reaches a downgrade and that the operator, wishing to hold down the speed, removes his foot from the accelerator. Piston 98 remains in its extreme right-hand position. All of the sections of the motor are, as we have seen, acting as idling pumps under no-load condition. Consequently the motor, so to speak, is "free wheeling." However since rotary element 18 of the drive shaft is trying to rotate faster than the speed of bodily rotation of pump 15, pressure is reversed within the pump, creating pressure at what is normally the inlet 43. This pressure will be transmitted via bore 51 to the center of pump by-pass valve 46 and, due to the differential pressure created by reason of the different effective areas of the pistons 47 and 48, will maintain the clutch valve in its closed position. The result of this is to generate in the pump that amount of pressure which is required to turn the engine at a speed generated by the momentum of the car. Thus free wheeling is prevented through the action of the differential valve of the automatic clutch, and the braking action of engine compression can be utilized.

To drive the car in the reverse direction, the operator will move the selector to bring arm 117 into the reverse position shown in Fig. 4, releasing pin 121 and depressing pin 122 so that piston 97 is free to move in response to pressure while piston 98 will be locked in its extreme right-hand position. Changes in the torque ratio within the motor unit for operation in reverse occur in the same manner as has been described with reference to forward operation.

From the foregoing description it will be understood that the operation of the automatic variable control valve of the motor unit changes the torque ratio as one or more of the motor sections are brought into operation or taken out of operation. The differential planetary action of the bodily rotating pump unit 15 and rotary element 18 of the drive shaft 17, as we have seen, produces an infinitely variable torque ratio which is superimposed upon, or modifies, the variation in torque ratio brought about by operation of the automatic control valve.

It will be understood that the hydraulic system I have described is filled with any suitable driving fluid such as hydraulic oil.

The terms and expressions which I have employed are used in a descriptive and not a limiting sense, and I have no intention of excluding such equivalents of the invention described, or of portions thereof, as fall within the purview of the claims.

I claim:

1. An automatic variable torque hydraulic transmission comprising a rotary hydraulic pump and a rotary hydraulic motor with interconnected fluid inlets and outlets in a closed positive hydraulic system arranged to drive the motor hydraulically from the pump, the pump having a by-pass conduit between its inlet and outlet and an automatic hydraulically actuated valve in said by-pass conduit operable in response to changes in fluid pressure within the pump for by-passing fluid directly from the pump outlet to the pump inlet under low pressure idling conditions and for closing the by-pass to transfer fluid to the motor under high pressure driving conditions, said hydraulically actuated valve comprising two connected pistons of different effective areas to create a pressure differential, the by-pass being arranged to be closed by one of the two pistons, and a fluid connection on the low-pressure side of the valve arranged to create a pressure differential and close the by-pass under conditions where pressure is reversed in the pump as in deceleration of the machine operated by the transmission.

2. In a transmission of the class described, a rotary hydraulic pump having a high pressure fluid outlet and a low pressure fluid inlet, a by-pass connecting said outlet with said inlet, a differential pressure piston valve in said by-pass, spring means normally holding said valve in open position under low pressure idling conditions, a fluid connection from said outlet to one end of said differential pressure piston valve for holding said valve in closed position against the action of said spring means under high pressure or driving conditions, and a second fluid connection from said inlet to another portion of said differential pressure piston valve to maintain a pressure differential for holding said valve in closed position under conditions where pressure is reversed in the pump as in deceleration of the pump.

3. An automatic variable torque hydraulic transmission comprising a rotary hydraulic pump section and a rotary hydraulic motor section hydraulically coupled through pressure and return lines in a closed positive hydraulic system in which the pressure line from said pump section leads to both sides of said motor section and the return line to said pump section leads from both sides of said motor section, valve means comprising two pressure actuated valve units, the pressure line and return line at each side of said motor section being controlled by a respective one of said valve units, said rotary hydraulic motor section comprising rotary fluid power members connected in parallel to one of said valve units at one side of said motor section and to the other of said valve units at the other side of said motor section, said two valve units also being connected to one another by a fluid conduit, and a manual selector movable to alternate settings in which each of the valve units can be selectively held in a position which opens the return line between said rotary fluid power members and the inlet of said rotary hydraulic pump section for free exhaust at one side of the motor section with the pressure line closed off while the other of said valve units is operable in response to changes in hydraulic pressure in the pressure line to admit fluid to one or more of said rotary fluid power members.

4. An automatic variable torque hydraulic transmission comprising a rotary hydraulic pump section and a rotary hydraulic motor section hydraulically coupled through pressure and return lines in a closed positive hydraulic system in which the pressure line from said pump section leads to both sides of said motor section and the return line to said pump section leads from both sides of said motor section, valve means comprising two pressure actuated valve units, the pressure line and return line at each side of said motor section being controlled by a respective one of said valve units, said rotary hydraulic motor section comprising rotary fluid power members connected in parallel to one of said valve units at one side of said motor section and to the other of said valve units at the other side of said motor section, said two valve units also being connected to one another by a fluid conduit, a manual selector movable to alternate settings in which each of the valve units can be selectively held in a position which opens the return line between said rotary fluid power members and the inlet of said rotary hydraulic pump section for free exhaust at one side of the motor section with the pressure line closed off while the other of said valve units is operable in response to changes in hydraulic pressure in the pressure line to admit fluid to one or more of said rotary fluid power members, and the pump section having a by-pass conduit between its inlet and outlet and an automatic hydraulically actuated valve in said by-pass conduit operable in response to changes in fluid pressure within the pump section.

References Cited in the file of this patent

UNITED STATES PATENTS

| Number | Name | Date |
|---|---|---|
| 1,001,176 | Snee | Aug. 22, 1911 |
| 1,172,802 | Keene | Feb. 22, 1916 |
| 1,354,592 | Bair | Oct. 5, 1920 |
| 1,998,922 | Chamberlain et al. | Apr. 23, 1935 |
| 2,057,087 | De Millar | Oct. 13, 1936 |
| 2,198,891 | Thoma | Apr. 30, 1940 |
| 2,326,804 | Sigmund et al. | Aug. 17, 1943 |
| 2,329,594 | Corrigan | Sept. 14, 1943 |
| 2,337,499 | Roth | Dec. 21, 1943 |
| 2,370,526 | Doran | Feb. 27, 1945 |
| 2,374,588 | Doran | Apr. 24, 1945 |
| 2,397,480 | Fullerton | Apr. 2, 1946 |
| 2,446,730 | Wemp | Aug. 10, 1948 |
| 2,536,486 | Berry | Jan. 2, 1951 |
| 2,573,864 | Moran | Nov. 6, 1951 |